(12) United States Patent
Conners et al.

(10) Patent No.: US 10,435,897 B2
(45) Date of Patent: Oct. 8, 2019

(54) FALL PROTECTION TOOL FOR USE IN BLOCKING AN OPENING

(71) Applicant: The Boeing Company, Chicago, IL (US)

(72) Inventors: James Conners, Clinton, WA (US); Steven Paul Kury, Everett, WA (US); Chase Alan Huston, Sultan, WA (US); Paul L. Rowe, Lake Stevens, WA (US); John W. Theeringer, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 15/346,376

(22) Filed: Nov. 8, 2016

(65) Prior Publication Data
US 2017/0328075 A1  Nov. 16, 2017

Related U.S. Application Data

(60) Provisional application No. 62/336,311, filed on May 13, 2016.

(51) Int. Cl.
| | |
|---|---|
| *E06B 3/68* | (2006.01) |
| *E04G 21/32* | (2006.01) |
| *E06B 9/00* | (2006.01) |
| *B64F 5/10* | (2017.01) |
| *B64F 5/40* | (2017.01) |
| *B64C 1/14* | (2006.01) |

(52) U.S. Cl.
CPC ............ *E04G 21/3266* (2013.01); *B64F 5/10* (2017.01); *B64F 5/40* (2017.01); *E06B 9/00* (2013.01); *B64C 1/1461* (2013.01); *E06B 2009/002* (2013.01)

(58) Field of Classification Search
CPC ... E06B 9/00; E06B 9/01; E06B 9/063; E06B 2900/002; B60P 7/14; E04G 21/3266; E04G 3/18; E06C 9/14; A47L 3/02
See application file for complete search history.

(56) References Cited

U.S. PATENT DOCUMENTS

| | | | | |
|---|---|---|---|---|
| 988,593 | A * | 4/1911 | Poss ........................ | E06C 9/14 |
| | | | | 182/163 |
| 1,609,657 | A * | 12/1926 | Montei ................... | A47L 3/02 |
| | | | | 182/53 |
| 3,741,340 | A * | 6/1973 | Andrews ................ | E06C 1/525 |
| | | | | 182/196 |

(Continued)

FOREIGN PATENT DOCUMENTS

| | | | | |
|---|---|---|---|---|
| CA | 2258294 A1 * | 4/1999 | ............... | E06C 1/56 |
| CA | 2415465 A1 * | 6/2004 | ............... | E06C 1/56 |

(Continued)

*Primary Examiner* — Jerry E Redman
(74) *Attorney, Agent, or Firm* — Armstrong Teasdale LLP

(57) ABSTRACT

A fall protection tool for use in blocking an opening in a doorframe. The tool includes a frame assembly including a pair of lateral posts spaced from each other and extending substantially parallel with each other, and at least one transverse post extending between the pair of lateral posts. The tool also includes a hook member coupled to each lateral post, wherein the hook member is configured to couple to a portion of the doorframe such that the frame assembly is hangable from the doorframe.

19 Claims, 4 Drawing Sheets

(56) References Cited

U.S. PATENT DOCUMENTS

| | | | | |
|---|---|---|---|---|
| 3,838,750 A | * | 10/1974 | Williams, Jr. | A62B 1/20 |
| | | | | 182/48 |
| 3,874,375 A | * | 4/1975 | Penner | A61H 1/0218 |
| | | | | 482/144 |
| 3,907,064 A | * | 9/1975 | Svalberg | E06C 9/14 |
| | | | | 182/196 |
| RE28,788 E | * | 4/1976 | Williamson, III | B60P 7/14 |
| | | | | 410/118 |
| 4,067,413 A | * | 1/1978 | Olsen | E06C 1/56 |
| | | | | 182/164 |
| 4,157,130 A | * | 6/1979 | Aberer | E06C 9/14 |
| | | | | 182/156 |
| 4,531,612 A | * | 7/1985 | Sandor | E06C 9/14 |
| | | | | 182/196 |
| 4,751,982 A | * | 6/1988 | Wolfe | E06C 9/14 |
| | | | | 182/164 |
| 4,867,275 A | * | 9/1989 | Islava | E06C 1/56 |
| | | | | 182/198 |
| 5,255,757 A | * | 10/1993 | Horowitz | E06C 1/52 |
| | | | | 182/127 |
| 6,279,681 B1 | * | 8/2001 | Dibelardino | E06C 1/525 |
| | | | | 182/198 |
| 6,382,352 B1 | * | 5/2002 | Dowe, Sr. | A62B 5/00 |
| | | | | 182/196 |
| 6,530,455 B1 | * | 3/2003 | Arnette | E06C 1/525 |
| | | | | 182/198 |
| 8,443,550 B1 | | 5/2013 | Burns | |
| 2002/0036117 A1 | * | 3/2002 | Rickman | A62B 3/00 |
| | | | | 182/70 |
| 2003/0067176 A1 | | 4/2003 | Stevens et al. | |
| 2004/0031646 A1 | * | 2/2004 | Huang | E06C 1/525 |
| | | | | 182/198 |
| 2007/0074932 A1 | * | 4/2007 | Mutscheller | E06C 7/00 |
| | | | | 182/107 |
| 2007/0186840 A1 | * | 8/2007 | Dvorak | B63B 27/146 |
| | | | | 114/362 |
| 2012/0098235 A1 | * | 4/2012 | DeMers | B60R 9/042 |
| | | | | 280/504 |
| 2012/0228057 A1 | * | 9/2012 | Barbara | E06C 9/14 |
| | | | | 182/93 |
| 2016/0333639 A1 | * | 11/2016 | Rowley | E06C 9/10 |

FOREIGN PATENT DOCUMENTS

| | | | | | |
|---|---|---|---|---|---|
| FR | 2979898 A1 | * | 3/2013 | | B64C 1/24 |
| GB | 343610 A | * | 2/1931 | | E06C 1/005 |
| GB | 419574 A | * | 11/1934 | | E06C 9/14 |
| GB | 1421131 A | * | 1/1976 | | E06C 1/56 |
| GB | 2026074 A | * | 1/1980 | | E06C 1/34 |
| KR | 2016-81162J | * | 11/2016 | | |

* cited by examiner

US 10,435,897 B2

FALL PROTECTION TOOL FOR USE IN BLOCKING AN OPENING

CROSS-REFERENCE TO RELATED APPLICATIONS

This application claims priority to U.S. Provisional Application No. 62/336,311 filed May 13, 2016, which is hereby incorporated by reference in its entirety.

BACKGROUND

The field of the present disclosure relates generally to safety devices and, more specifically, to a fall protection tool for use in blocking an opening, such as an open doorway.

In the aviation industry, the main deck doors of an aircraft are sometimes opened to enable performance of routine maintenance on the aircraft. For example, the main deck doors are sometimes opened before performance of a test flight to check gust locks and seals of the main deck doors. On some occasions, the main deck doors are opened without having stairs or a jet bridge positioned nearby. As such, maintenance workers located within the aircraft are at risk of falling through an open door and potentially injuring themselves. At least one known method of protecting the maintenance workers from potential falls includes installing a safety net across an open doorway. However, known safety nets are typically designed for installation only after the main deck doors have already been opened.

BRIEF DESCRIPTION

In one aspect, a fall protection tool for use in blocking an opening in a doorframe is provided. The tool includes a frame assembly including a pair of lateral posts spaced from each other and extending substantially parallel with each other, and at least one transverse post extending between the pair of lateral posts. The tool also includes a hook member coupled to each lateral post, wherein the hook member is configured to couple to a portion of the doorframe such that the frame assembly is hangable from the doorframe.

In another aspect, a method of blocking an opening in a doorframe of a structure is provided. The method includes providing a fall protection tool that includes a pair of lateral posts spaced from each other and extending substantially parallel with each other, and at least one transverse post extending between the pair of lateral posts. The method further includes hanging the fall protection tool from the doorframe such that the at least one transverse post extends across an opening in the doorframe.

DETAILED DESCRIPTION

The implementations described herein relate to a fall protection tool for use in blocking an opening, such as an open doorway. More specifically, the fall protection tool described herein is designed for installation on an interior of a vehicle or structure such that the open doorway is at least partially blocked before being opened, such as by opening an associated door, for example. The fall protection tool includes a frame assembly and a pair of hooks coupled to the frame assembly. The frame assembly restricts access through the open doorway with an arrangement of rigid posts and the hooks are designed for engagement with an existing component of the vehicle or structure. Moreover, the fall protection tool includes one or more hinges coupled along the rigid posts, or coupled between the hooks and the frame assembly. The hinges coupled along the rigid posts enable compaction of the frame assembly and facilitate conformity to contours of the vehicle or structure when the tool is installed thereon. In addition, the hinges coupled between the hooks and the frame assembly provide dimensional flexibility for blocking open doorways of different sizes. As such, the tool described herein provides a portable, lightweight, and easy to use solution for providing fall protection to personnel within a vehicle or structure.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
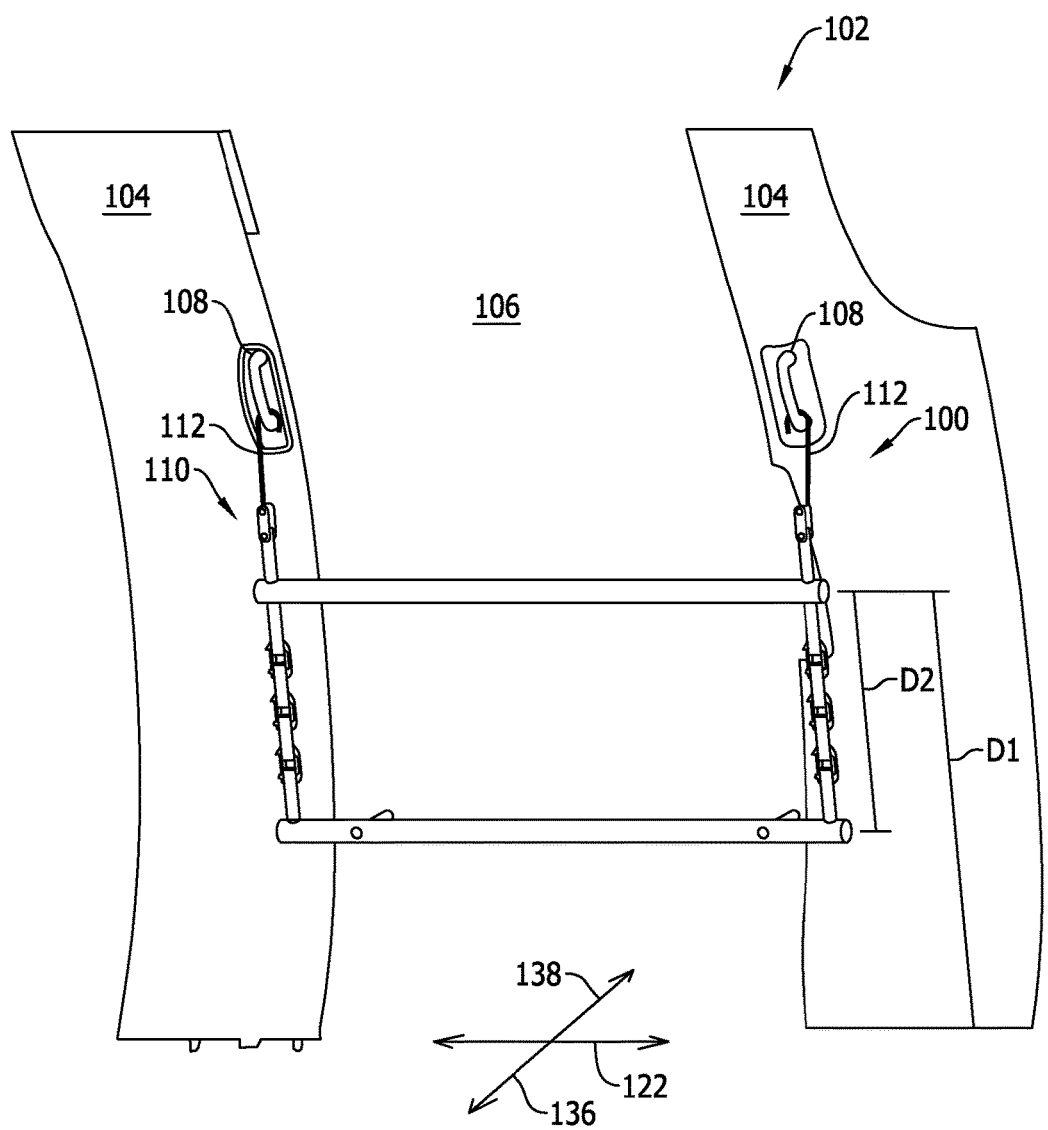
FIG. 1 is a perspective view of an exemplary fall protection tool installed on a doorframe.

FIG. 1 is a perspective view of an exemplary fall protection tool 100 installed on a doorframe 102. In the exemplary implementation, doorframe 102 is defined by a pair of side walls 104 having an opening 106 defined therebetween. Each side wall 104 includes a handle 108 positioned on opposing sides of opening 106. As will be described in more detail below, fall protection tool 100 is configured for engagement with handles 108. Moreover, as shown, side walls 104 have an arcuate profile and are implemented as a portion of an interior of an aircraft fuselage. Alternatively, side walls 104 are implemented as a portion of a building or any structure where opening 106 is positioned away from ground level.

Figure 2:
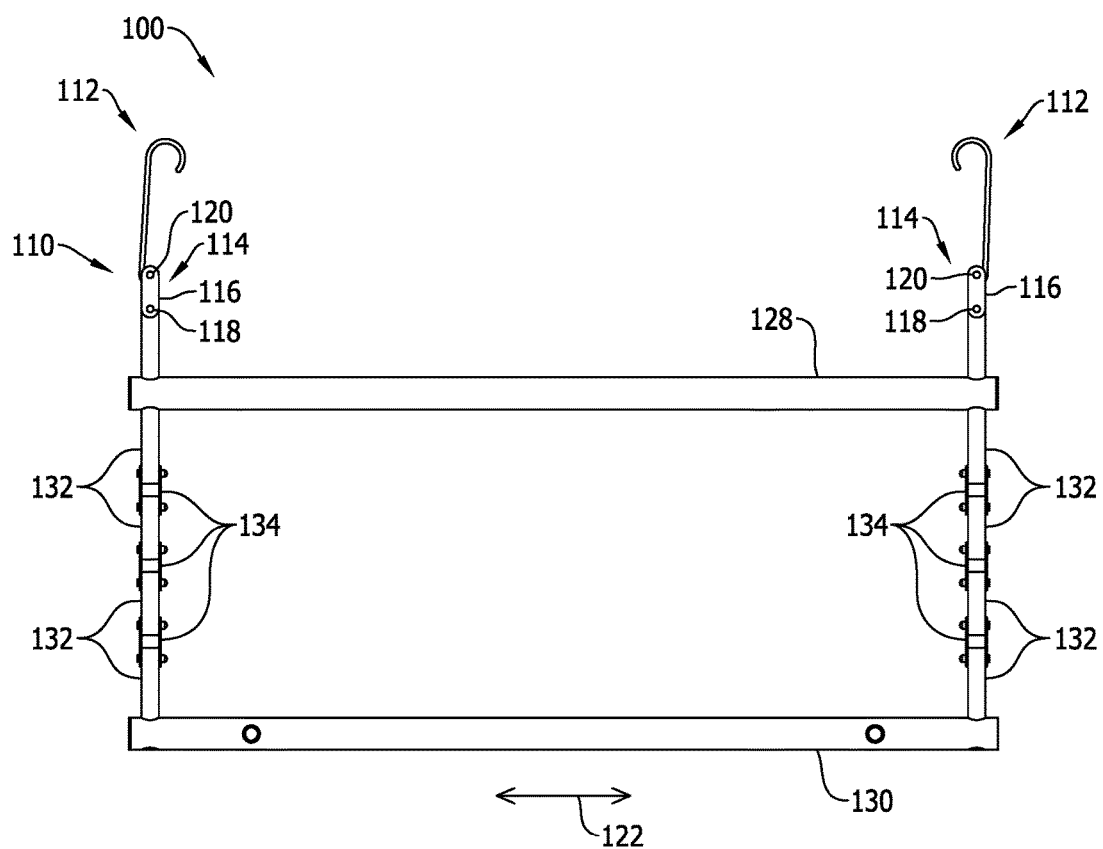
FIG. 2 is a front view illustration of the fall protection tool shown in FIG. 1.
Figure 3:
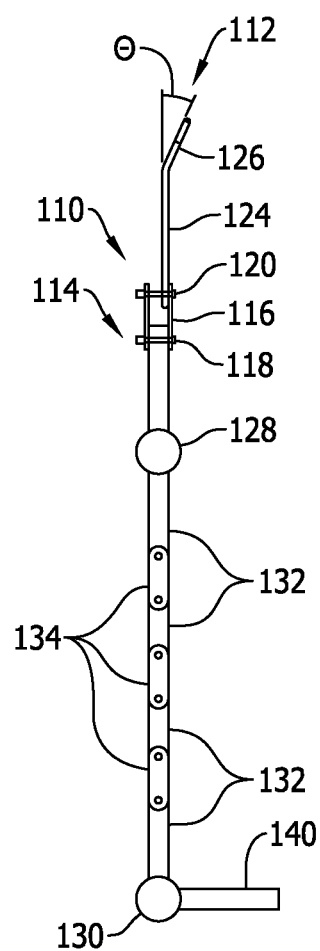
FIG. 3 is a side view illustration of the fall protection tool shown in FIG. 1.

FIG. 2 is a front view illustration of fall protection tool 100, and FIG. 3 is a side view illustration of fall protection tool 100. In the exemplary implementation, fall protection tool 100 includes a frame assembly 110 and at least one hook member 112 coupled to frame assembly 110. Frame assembly 110 includes a pair of lateral posts 114 spaced from each other and extending substantially parallel with each other. Frame assembly 110 also includes at least one transverse post extending between the pair of lateral posts 114. As shown, hook members 112 are coupled to each lateral post 114. As such, hook members 112 couple to a portion of an existing structure such that frame assembly 110 hangs from the existing structure. Referring to FIG. 1, hook members 112 couple to a portion of doorframe 102. More specifically, hook members 112 engage with handles 108 such that frame assembly 110 hangs from doorframe 102. More specifically, when hanging from doorframe 102, lateral posts 114 are oriented vertically, and the at least one transverse post is oriented horizontally.

Referring again to FIGS. 2 and 3, fall protection tool 100 further includes a first hinge 116 coupled between hook members 112 and each lateral post 114 such that hook members 112 are rotatable relative to lateral posts 114. More specifically, first hinge 116 includes a first pivot point 118 and a second pivot point 120. First hinge 116 is coupled to lateral posts 114 at first pivot point 118, and hook members 112 are coupled to first hinge 116 at second pivot point 120. Moreover, first hinge 116 and hook members 112 are oriented relative to frame assembly 110 such that hook members 112 are rotatable for movement in a crosswise direction 122. As such, rotatable hook members 112 provide dimensional flexibility to fall protection tool 100 for extending across and blocking openings of different sizes.

Referring to FIG. 3, each hook member 112 includes a shank portion 124 and a hook portion 126. In the exemplary implementation, shank portion 124 is bent such that hook portion 126 is oriented obliquely relative to shank portion 124. More specifically, hook portion 126 is oriented obliquely relative to shank portion 124 by angle θ, defined within a range between about 0 degrees and 90 degrees. In addition, hook portion 126 is oriented obliquely relative to crosswise direction 122 (shown in FIG. 2) to facilitate engagement with handles 108 (shown in FIG. 1). As such, hook portion 126 extends towards side walls 104 (shown in FIG. 1) for engagement with handles 108, such as when handles 108 are recessed within side walls 104. In an alternative implementation, hook members 112 are any latching or fastening device that enables fall protection tool 100 to function as described herein.

As described above, frame assembly 110 includes a pair of lateral posts 114 spaced from each other and extending substantially parallel with each other, and at least one transverse post extending between the pair of lateral posts 114. More specifically, the at least one transverse post extends in crosswise direction 122 such that lateral posts 114 and the at least one transverse post are oriented substantially perpendicularly with each other. Moreover, the posts described herein are fabricated from any material that enables fall protection tool 100 to function as described herein. Exemplary materials include, but are not limited to, aluminum and steel. As such, frame assembly 110 is capable of withstanding loads induced by the body of personnel, for example, without failure to facilitate blocking the personnel from falling through opening 106 (shown in FIG. 1). Moreover, in one implementation, the posts are hollow to facilitate reducing the weight of frame assembly 110.

In the exemplary implementation, the at least one transverse post includes a first transverse post 128 and a second transverse post 130. First transverse post 128 is positioned a first distance from hook members 112, and second transverse post 130 is positioned a greater second distance from hook members 112. As such, first transverse post 128 and second transverse post 130 block opening 106 at different heights along doorframe 102 (each shown in FIG. 1) when fall protection tool 100 is hung from doorframe 102. Moreover, a length of first transverse post 128 and second transverse post 130 is greater than a width of opening 106. As such, frame assembly 110 is restricted from falling through opening 106.

In some implementations, the distance of first transverse post 128 from hook members 112, and the distance between first transverse post 128 and second transverse post 130 are predetermined in accordance with one or more safety regulations. For example, the distance of first transverse post 128 from hook members 112 is selected such that first transverse post 128 is positioned a first predetermined distance D1 (shown in FIG. 1) from a floor of a vehicle or structure when fall protection tool 100 is hung from doorframe 102 of the vehicle or structure. Moreover, the distance between first transverse post 128 and second transverse post 130 is selected such that a distance between first transverse post 128 and second transverse post 130 does not exceed a second predetermined distance D2 (shown in FIG. 1). In one implementation, first predetermined distance D1 is defined within a range between about 39 inches and about 42 inches, and second predetermined distance D2 is less than about 19 inches.

Referring again to FIGS. 2 and 3, each lateral post 114 includes at least two lateral post segments 132 and at least one second hinge 134 coupled between the at least two lateral post segments 132 such that lateral post segments 132 are rotatable relative to each other. More specifically, second hinge 134 is oriented on frame assembly 110 such that lateral post segments 132 are rotatable for movement in an inboard direction 136 or an outboard direction 138 (each shown in FIG. 1). As such, frame assembly 110 is foldable for forming a compact design and to facilitate portability and, when installed on doorframe 102 (shown in FIG. 1), enables frame assembly 110 to conform to contours of the structure (e.g., a housing for an emergency slide included on the interior of an aircraft door).

Referring to FIG. 3, frame assembly 110 further includes a pair of retaining posts 140 extending substantially perpendicularly relative to the pair of lateral posts 114 and the at least one transverse post. More specifically, in the exemplary implementation, the pair of retaining posts 140 are coupled to second transverse post 130. The pair of retaining posts 140 are offset from the pair of lateral posts 114 in crosswise direction 122 (shown in FIG. 1) such that the pair of retaining posts 140 are spaced from each other by a distance less than a distance between the pair of lateral posts 114. As such, retaining posts 140 are positioned for insertion through opening 106 when fall protection tool 100 is installed on doorframe 102 (shown in FIG. 1).

Moreover, retaining posts 140 have a length that facilitates retaining frame assembly 110 in a blocking position when fall protection tool 100 is installed on doorframe 102. More specifically, referring to FIG. 1, fall protection tool 100 is installed on doorframe 102 such that retaining posts 140 are oriented in outboard direction 138. The length of retaining posts 140 is selected such that retaining posts 140 extend through opening 106 and at least partially beyond side walls 104. As such, retaining posts 140 restrict movement of frame assembly 110 in crosswise direction 122 when installed on doorframe 102, and restrict frame assembly 110 from falling through opening 106 in outboard direction 138 by retaining lateral posts 114 against side walls 104.

Figure 4:
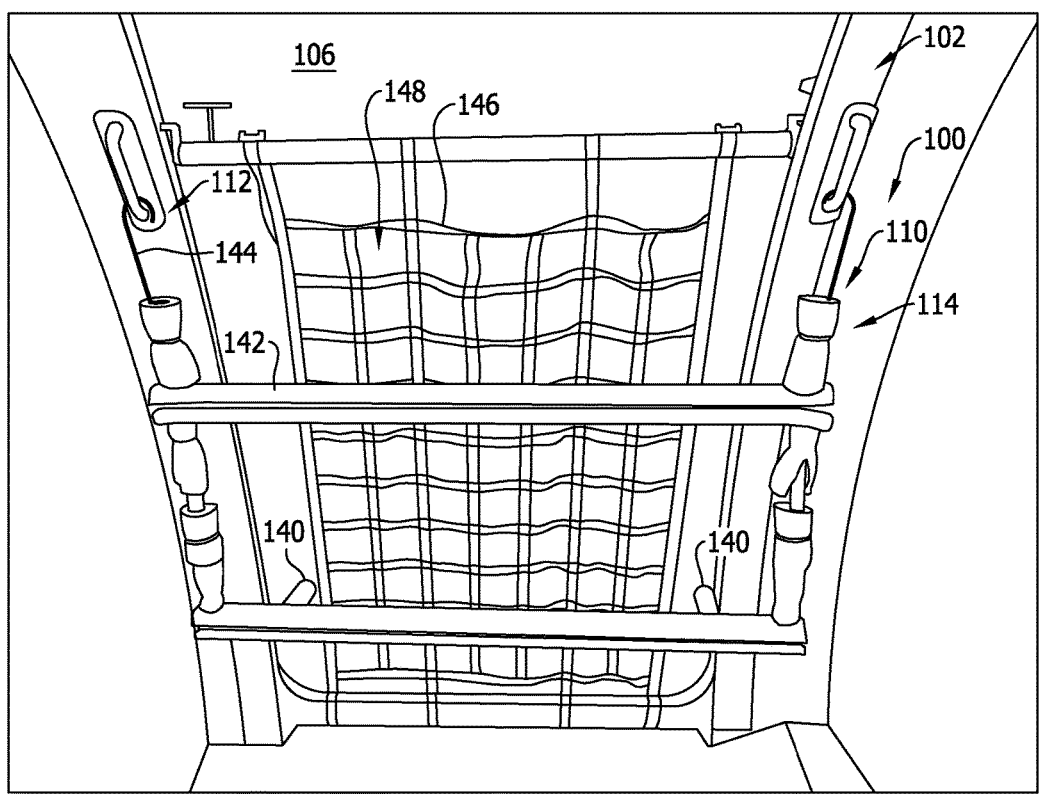
FIG. 4 is a view of the fall protection tool shown in FIG. 1 in use.

FIG. 4 is a view of fall protection tool 100 in use. In the exemplary implementation, fall protection tool 100 includes one or more design features for reducing the likelihood of damage to doorframe 102 when installed thereon. For example, frame assembly 110 includes a layer 142 of protective padding extending over the pair of lateral posts 114, the at least one transverse post, and the pair of retaining posts 140. An exemplary protective padding includes, but is not limited to, a foam padding material. Moreover, hook members 112 include a layer 144 of protective coating applied thereto. An exemplary protective coating includes, but is not limited to, a plastisol material.

In addition, a safety net 146 is hung from and coupled within doorframe 102. Safety net 146 includes a plurality of strips of fabric material arranged in a crosswise orientation such that a plurality of openings 148 are defined therein. As such, safety net 146 facilitates blocking objects from falling through opening 106, while fall protection tool 100 facilitates blocking personnel from falling through opening 106. In one implementation, safety net 146 is hung from doorframe 102 after hanging fall protection tool 100 from doorframe 102.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fall protection tool for use in blocking an opening in a doorframe of a structure, said tool comprising:
    a frame assembly comprising:
        a pair of lateral posts spaced from each other and extending substantially parallel with each other; and
        at least one transverse post extending between said pair of lateral posts;
        a pair of retaining posts extending from said at least one transverse post, and oriented to extend within the opening, such that lateral movement of the fall protection tool is restricted relative to the opening; and
    a hook member coupled to each lateral post, wherein said hook member is configured to couple to a portion of the doorframe such that said frame assembly is hangable from the doorframe.

2. The tool in accordance with claim 1 further comprising a first hinge coupled between said hook member and said each lateral post such that said hook member is rotatable relative to said each lateral post.

3. The tool in accordance with claim 1, wherein said hook member comprises a shank portion and a hook portion, wherein said shank portion is bent such that said hook portion is oriented obliquely relative to said shank portion.

4. The tool in accordance with claim 1, wherein each said lateral post comprises:
    at least two lateral post segments; and
    at least one second hinge coupled between said at least two lateral post segments such that said at least two lateral post segments are rotatable relative to each other.

5. The tool in accordance with claim 1, wherein said pair of retaining posts extend substantially perpendicularly relative to said pair of lateral posts and said at least one transverse post.

6. The tool in accordance with claim 1, wherein said at least one transverse post comprises a first transverse post and a second transverse post, said first transverse post positioned a first distance from said hook member and said second transverse post positioned a greater second distance from said hook member.

7. The tool in accordance with claim 6, wherein said first transverse post is positioned a first predetermined distance from a floor of the structure when said frame assembly is hung from the doorframe, the first predetermined distance defined within a range between about 39 inches and about 42 inches.

8. The tool in accordance with claim 6, wherein said first transverse post and said second transverse post are positioned a second predetermined distance from each other, the second predetermined distance less than about 19 inches.

9. The tool in accordance with claim 1, wherein said frame assembly further comprises a layer of protective padding extending over said pair of lateral posts and said at least one transverse post.

10. The tool in accordance with claim 1, wherein said hook member further comprises a layer of protective coating applied thereto.

11. The tool in accordance with claim 1, wherein said each lateral post comprises a distal end, said hook member coupled to said each lateral post at said distal end.

12. A method of blocking an opening in a doorframe of a structure, said method comprising:
    providing a fall protection tool that includes a pair of lateral posts spaced from each other and extending substantially parallel with each other, at least one transverse post extending between the pair of lateral posts, and a pair of retaining posts extending from the at least one transverse post; and
    hanging the fall protection tool from the doorframe with at least one hook such that the at least one transverse post extends across the opening in the doorframe, and such that the pair of retaining posts extend within the opening to restrict lateral movement of the fall protection tool relative to the opening.

13. The method in accordance with claim 12, wherein hanging the fall protection tool comprises hanging the fall protection tool from an interior of the structure.

14. The method in accordance claim 12, wherein hanging the fall protection tool comprises hanging the fall protection tool before opening a door positioned within the doorframe.

15. The method in accordance with claim 14, wherein the pair of retaining posts are coupled to the at least one transverse post and extend substantially perpendicularly relative to the pair of lateral posts and the at least one transverse post.

16. The method in accordance with claim 14, wherein the doorframe includes handles positioned on opposing sides of the opening, wherein hanging the fall protection tool comprises hooking the fall protection tool to the handles.

17. The method in accordance with claim 12, wherein hanging the fall protection tool comprises orienting the pair of lateral posts vertically such that the pair of lateral posts are positioned on opposing sides of the opening in the doorframe.

18. The method in accordance with claim 12 further comprising hanging a safety net from the doorframe.

19. The method in accordance with claim 18, wherein hanging a safety net comprises hanging the safety net from the doorframe after hanging the fall protection tool from the doorframe.

* * * * *